United States Patent [19]

Schaefer et al.

[11] 3,961,494
[45] June 8, 1976

[54] SOFT FOOD MIX DISPENSING APPARATUS AND METHOD

[75] Inventors: Robert Schaefer, Lakeview; Richard L. Hammell, Lima, both of Ohio

[73] Assignee: The Kroger Company, Cincinnati, Ohio

[22] Filed: Feb. 14, 1975

[21] Appl. No.: 550,039

[52] U.S. Cl.................................. 62/73; 62/138; 62/352; 62/340; 426/565
[51] Int. Cl.² .................... A23G 9/00; F25C 5/08
[58] Field of Search .............. 62/352, 306, 156, 66, 62/340, 135, 136, 73, 138; 165/61, 63; 426/565, 524

[56] References Cited
UNITED STATES PATENTS

| | | | |
|---|---|---|---|
| 2,787,443 | 4/1957 | Meagher et al.................. | 165/61 X |
| 3,015,218 | 1/1962 | Wakeman......................... | 62/342 X |
| 3,802,217 | 4/1974 | Garavelli.......................... | 62/306 |
| 3,823,571 | 7/1974 | Smith et al....................... | 62/352 X |

*Primary Examiner*—William E. Wayner
*Attorney, Agent, or Firm*—Cushman, Darby & Cushman

[57] ABSTRACT

A method and apparatus for dispensing a soft food mix, such as soft ice cream, milk shakes, yogurt or the like whereby mix from a pressurized container passes through a heat exchanger and particularly passes in a line disposed within a hollow coil immediately adjacent to a second line which carries either a heating or cooling fluid to prevent formation of an ice plug and maintain the proper consistency. Thermisters disposed on the coil sense the temperature of the mix and provide electrical control signals to automatically control supply of the heating and cooling fluids.

14 Claims, 4 Drawing Figures

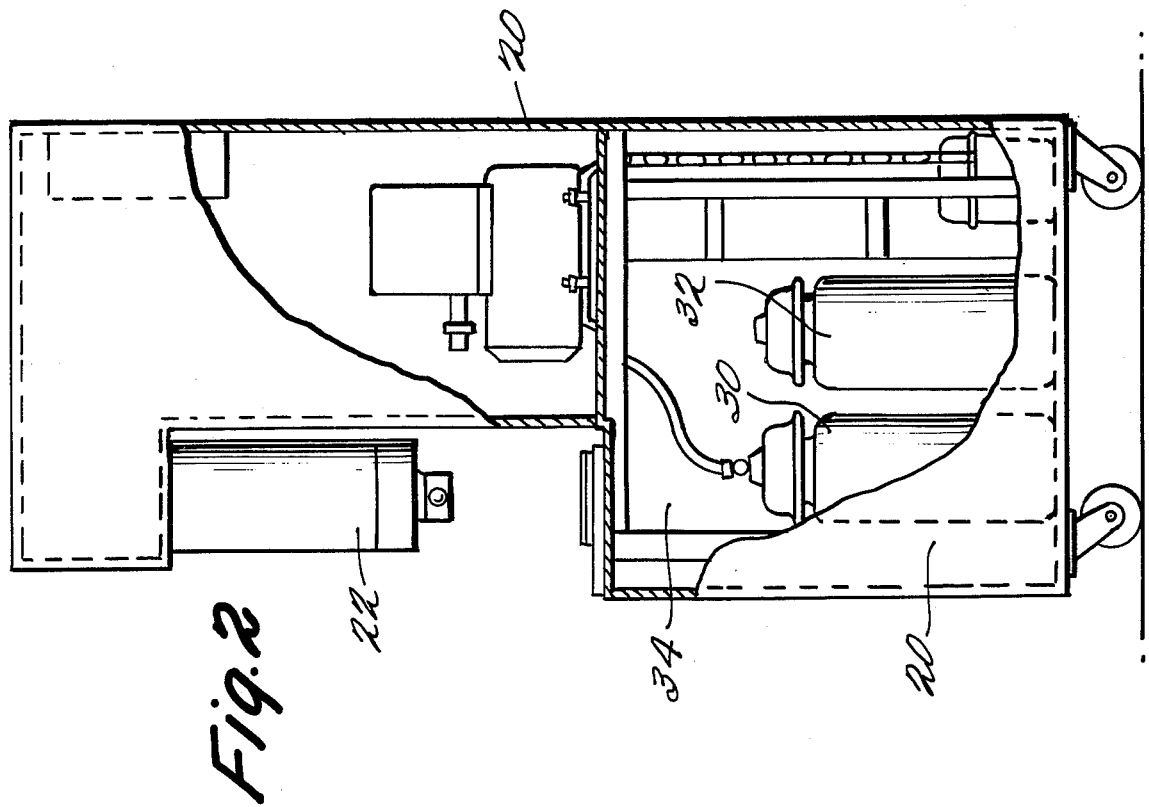
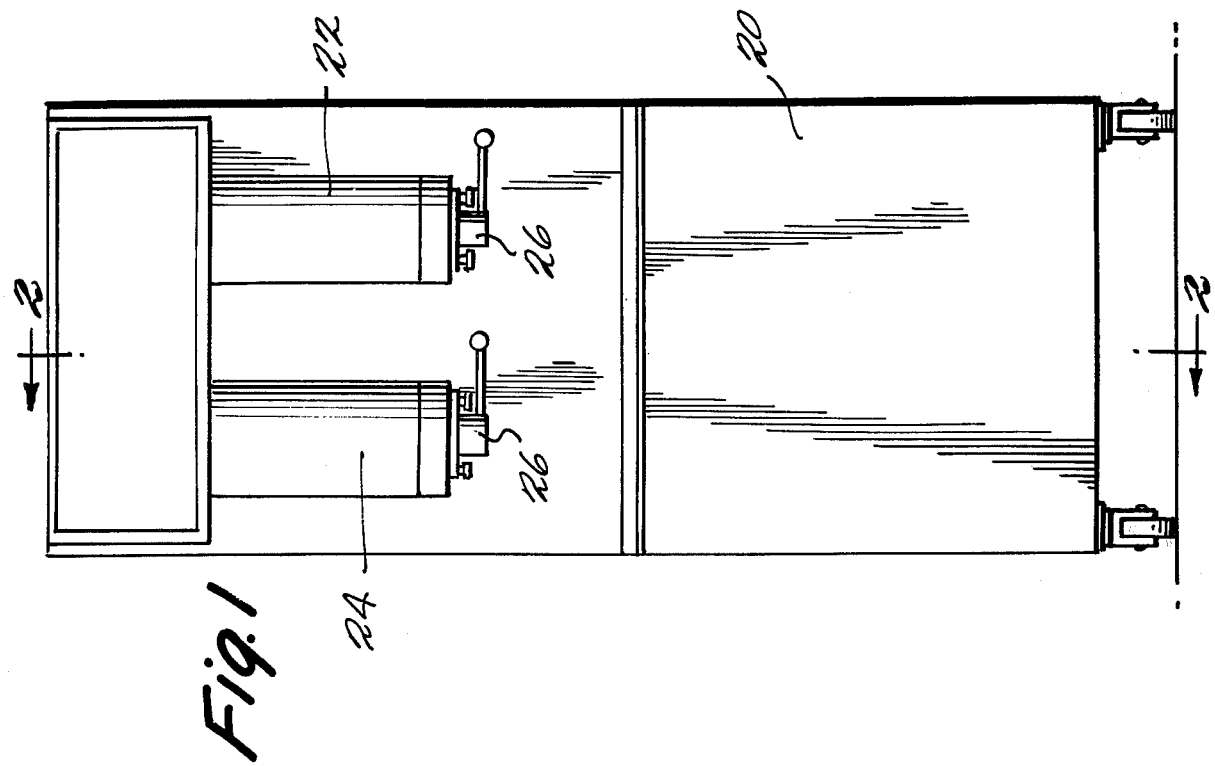

3,961,494

SOFT FOOD MIX DISPENSING APPARATUS AND METHOD

BRIEF DESCRIPTION OF THE PRIOR ART AND SUMMARY OF THE INVENTION

The invention relates to an improved apparatus for dispensing a soft food mix or frozen confection, such as soft ice cream, milk shakes, yogurt, or the like.

Vast quantities of soft ice cream, milk shakes, and similar products are consumed annually in the United States. Usually, the constituents of such soft food products are mixed in large quantities at some central location and then shipped under refrigeration in pressurized containers to the individual shops where the product is sold. The product is often combined with nitrous oxide and/or Freon (Trademark) which expands the volume of the product. The amount of nitrous oxide or other gas added is usually expressed as "percentage overrun".

The gases usually are added to the soft food mix in the dispensing machine and particularly as the soft food mix moves under pressure from the refrigerated container within the machine to the dispensing valve. However, it is also possible, and preferable under most circumstances, to add the gases at the central location before the soft food mix is placed in the containers in which it is transported to the dispensing machines.

U.S. patent application Ser. No. 520,204 filed Nov. 11, 1974, describes a method and system for adding "overrun" to the mix before placing it in the pressurized containers. Typically, an ice cream or milk shake dispensing machine includes a refrigerated compartment which stores one or more containers of the soft food mix to be dispensed. These containers are connected by suitable lines to a chamber in which an auger, scraper or the like continually operates to prevent the soft food mix from freezing to a solid ice plug in the chamber, preventing further dispensing. Maintenance of a desired temperature is difficult because the rate of dispensing may vary greatly over a short period of time. At the bottom of the chamber a suitable manually operated valve is provided for dispensing the mix from the chamber. The patent to Newby, U.S. Pat. No. 3,004,404, describes a machine of this general type.

This type of machine, while it does satisfactorily dispense soft food mix and similar frozen confections, is necessarily a mechanically complex and expensive machine. The auger must be carefully machined and mechanical structure must be provided for rotating the same. Further, proper sanitation requires that the machine be disassembled at regular intervals, for example each day, and all of the components which contact the soft food mix fully and completely cleaned to prevent the growth of harmful bacteria. Cleaning the auger and the associated mechanism is a lengthy and unpleasant task.

It is desirable accordingly to eliminate the mechanical components which rotate within the chamber from which the soft food mix is dispensed. Disposing a heat exchanger about the chamber of course will prevent the soft food mix temporarily stored therein from melting into an unsatisfactory liquid. The patent to Calim, U.S. Pat. No. 3,828,572, describes a soft food mix dispensing machine with such a heat exchanger. However, it has been found that with only a heat exchanger the soft food mix will inevitably at some point freeze to an ice plug preventing proper dispensing, and particularly will freeze to the exterior surfaces of the chamber which are closest to the heat exchanger and which accordingly are cooled to the lowest temperature.

The present invention relates to an improved dispensing machine whereby the complex mechanical arrangements required in the past are replaced. Instead a heat exchanger in operative relation with the soft food mix to be dispensed serves to keep it at an appropriate temperature. To prevent freezing of the soft food mix which would prevent further dispensing, structure is provided for periodically, and preferably automatically in response to sensed temperature, supplying a heating fluid to the heat exchanger to melt the ice which is forming and to properly maintain the soft food mix. The machine is particularly easy to sanitize.

More particularly as described in the embodiment of the invention set forth in detail below, the dispensing chamber preferably comprises a coil of suitable length with a line from the pressurized container of soft food mix passing therethrough immediately adjacent to a second line connected to a refrigeration system for providing appropriate cooling. Heat sensing thermistors which provide electrical signal varying as a function of the sensed temperature are preferably disposed at various locations to sense the temperature of the heat exchanger coil. An electrical control circuit responsive to the signals produced by the thermistors controls the operation of the compressor in the refrigeration system and valves connected thereto to circulate either the hot uncondensed gases from the condenser through the coils to heat the soft food mix or the refrigeration liquid to cool the same.

Many other objects and purposes of the invention will be clear from the following detailed description of the drawings.

BRIEF DESCRIPTION OF THE DRAWINGS

FIG. 1 shows a front view of a soft food dispensing machine such as an ice cream or milk shake machine (according to this invention).

FIG. 2 shows a cut-away view of the machine of FIG. 1 along the lines 2—2.

DETAILED DESCRIPTION OF THE DRAWINGS

Figure 3:
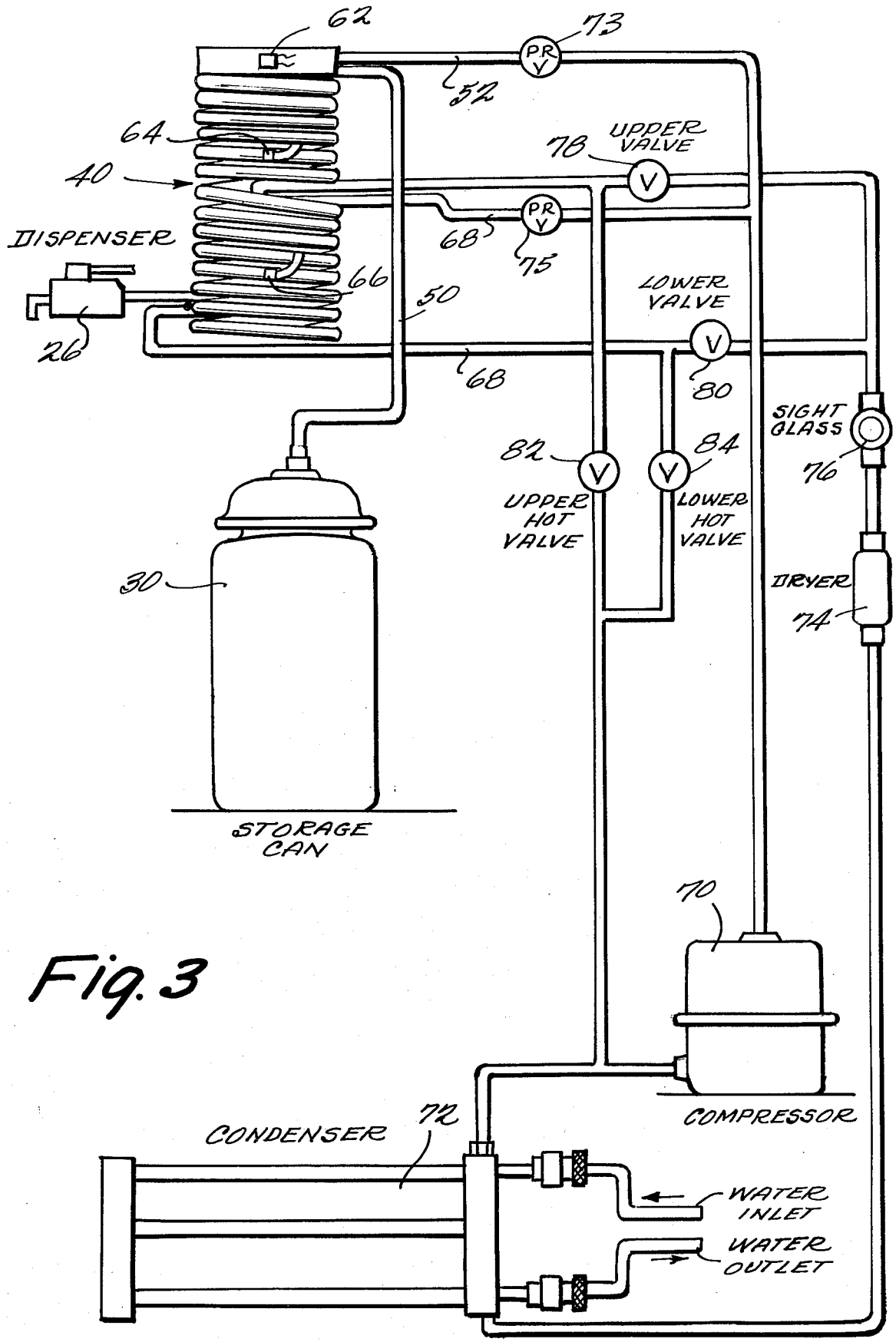
FIG. 3 shows a schematic view of the system of this invention for automatically heating and cooling the soft food mix in the dispensing coil.

Reference is now made to FIGS. 1 and 2 which illustrate a front and sectional view of the unique dispensing machine of this invention. The machine includes a housing 20, a pair of dispensing chambers 22 and 24, and conventional valves 26 and 28 mounted at the bottom of chambers 22 and 24 respectively for manual operation to dispense a soft food such as a milk shake from the respective chambers. As can be seen in FIG. 2, pressurized containers 30 and 32 are stored within a refrigerated chamber 34 in the bottom of housing 20. Containers 30 and 32 contain the soft food mix to be dispensed at a pressure above atmospheric pressure and have been delivered from a central location. Air pressure is conventionally supplied by a small air compressor coupled to the containers (not shown).

In the embodiment of this invention the overrun (gases) is already in the soft food containers as described in the above-mentioned application. For clarity, in FIG. 2, the various lines and connections which comprise the refrigeration system and which connect the dispensing coil to the respective containers 30 and 32 as well as the various valves have been omitted. These connections are fully illustrated in FIG. 3 and can be arranged within the housing as desired to make optimum use of the available space. Coil 40 as discussed briefly above is disposed in chamber 24 and a pair of flexible lines, one from a soft food containers 30 and 32 and one from the refrigeration system, are disposed within coil 40.

Reference is now made to FIG. 3 which illustrates a schematic diagram of the dispensing arrangement. As discussed briefly above, line 50 connects the soft food pressurized container 30 to the dispensing valve 26 via heat exchanger coil 40. Coil 40 is preferably a rigid stainless steel with flexible line 50 spiralled therein in close association first with line 52 which carries the heating and cooling medium and then with line 68. A first thermistor 62 is mounted adjacent where line 50 enters stainless steel 40 to sense the input mix temperature. (One way in which the thermistor can be mounted is by grinding away the outer surface of a portion of the coil and installing the thermistor therein before covering the ground-away portion with epoxy or the like).

A second thermistor 64 is similarly mounted on coil 40 about half way between where line 52 enters the coil and where it leaves. In the embodiment of FIG. 3, two separate lines for refrigerant and heating fluids have been employed since independent control of the lines has been found to provide particularly satisfactory operation. One of the lines runs through the top half of coil 40 while the other runs through the lower half. For a smaller coil, or for many circumstances, a single line for the refrigerant may be satisfactory. A third thermistor 66 is similarly mounted about half way between where refrigerant and heating line 68 enters coil 40 and where it leaves.

Compressor 70, heat exchanger 72, dryer 74, site glass 76 and pressure-regulation valves 73 and 75 form a conventional refrigeration system suitable for cooling a soft food mix. The refrigerating fluid flows to line 52 via conventional upper valve 78 and to line 68 via lower valve 80. Similarly, the output of compressor 70 which comprises hot gases which have not yet been condensed by condenser 72 is coupled to lines 52 and 68 via conventional upper hot valve 82 and lower hot valve 84, respectively, so that either hot uncondensed gases or a cooling liquid can be supplied to lines 52 and 68.

Figure 4:
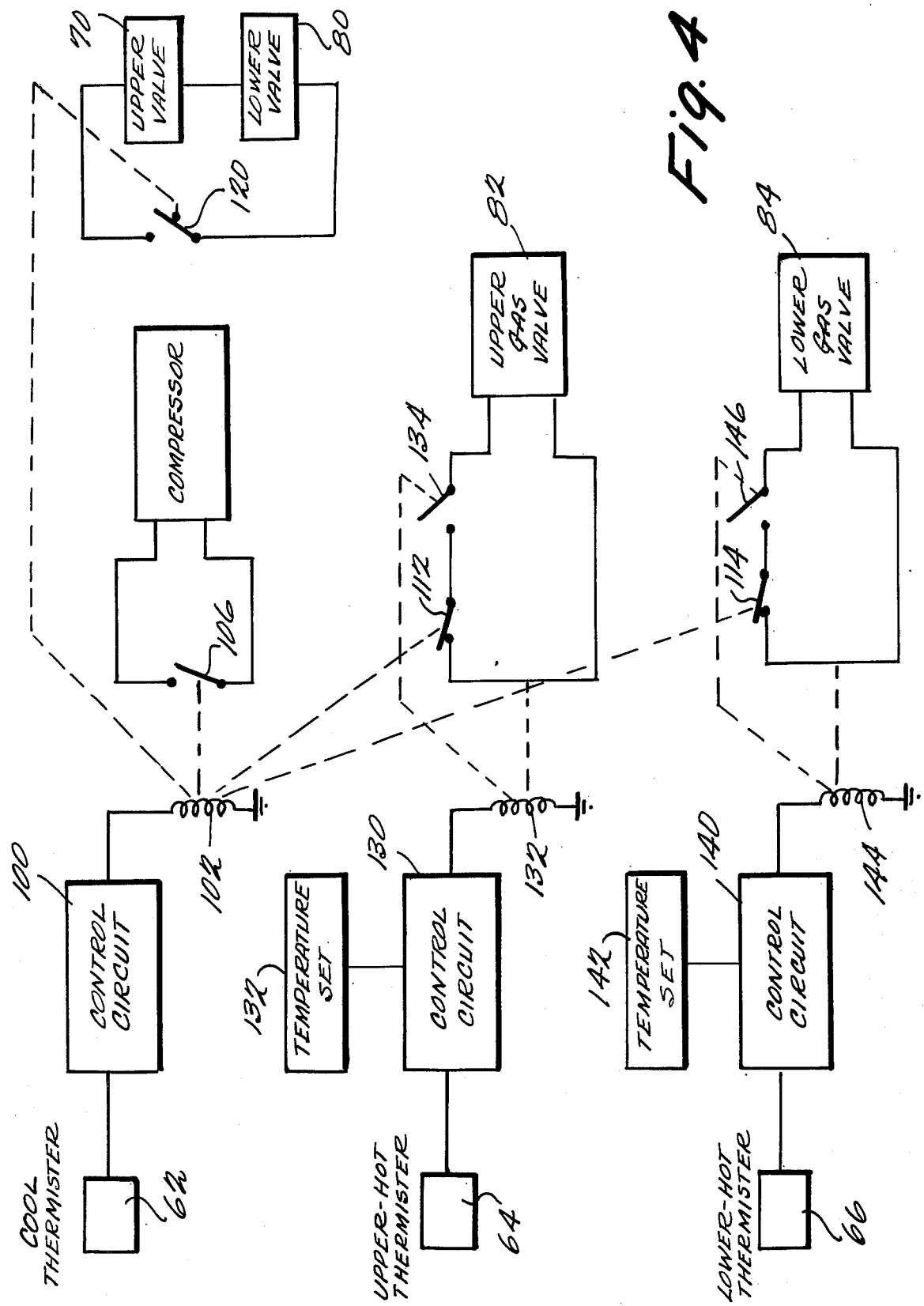
FIG. 4 shows the control circuit for controlling the valves and compressor of FIG. 3 automatically in response to the temperature sensed by the thermistors.

Reference is now made to FIG. 4 which illustrates the control circuitry for controlling the valves 78, 80, 82 and 84. Thermistor 62 is connected to conventional control circuit 100 which operates relay 102 to close switch 106 whenever the electrical signal received from thermistor 62 indicates that the temperature has dropped below a predetermined set value. Closing switch 106 operates to complete a current path to the compressor motor which accordingly begins functioning to supply cooling liquid. Relay 102 also controls normally closed switches 112 and 114 which reopen when switch 102 is activated to prevent operation of either upper hot valve 82 or lower hot valve 84. Accordingly, the gas valves 82 and 84 cannot open to supply hot gas to the lines while the compressor is operating to supply liquid refrigerant.

Relay 102 also controls switch 120 which when closed completes a current path to activate upper and lower valves 78 and 80 to supply refrigerant to lines 52 and 68 respectively.

Upper hot thermistor 64 is coupled to a similar control circuit 130 to which is connected a suitable arrangement for setting a temperature at which the upper hot thermistor will produce a signal which causes control circuit 130 to operate relay 132 to close switch 134. If switch 112 is closed indicating that the compressor is not operating, closing switch 134 activates upper gas valve 82 to supply hot gases to line 52. Alternately, the compressor can be operated while the hot gases are being used to heat the coils. Similarly, lower hot thermistor 66 is connected to control circuit 140 which is under the control of a suitable arrangement 142 for setting the temperature at which lower thermistor produces an electrical signal which causes control circuit 140 to activate relay 144 which closes control switch 146 and, provided switch 114 is closed indicating the compressor is not functioning, completes a current path through lower gas valve 84 to supply hot gas to the lower line 68. It may be desirable to set the thermistors 64 and 66 to respond to different temperatures, for example, to keep the food mix in the lower portion of the coil at a temperature lower than the food mix in the upper portion of coil 40.

The gas valves and the control circuits may be formed of any conventional devices readily available. While using the hot gases from the compressor provides a convenient way to heat the coil, any other suitable arrangement such as electrical heaters can be employed. Similarly a brine solution circulated about the coil could be used for effecting cooling. In addition, while the use of a stainless steel coil is a convenient heat exchanger, any other suitable arrangement can be utilized for that purpose.

Since the machine has no moving parts, disassembly is not necessary to clean and sanitize the machine, but rather only disassembly of the dispensing head is required. To clean out the unit, line 62 can be connected to a source of water and the line 62 and valve 26 completely flushed until the water runs clear. Next line 62 is coupled to a container of conventional sanitizing fluid which is dispensed through valve 26 until 2–3 gallons have been removed. Finally, the sanitizing solution is blown out with air.

Many other changes and modifications in the above described embodiment of the invention can, of course, be carried out without departing from the scope thereof. Accordingly that scope is intended to be limited only to the scope of the appended claims.

What is claimed is:

1. An apparatus for dispensing a soft food mix comprising:
    a source of soft food mix at a pressure above atmospheric pressure,
    heat exchanger means for storing a quantity of said mix without mechanical agitation,
    valve means coupled to said heat exchanger means for selectively dispensing mix from said heat exchanger,
    means coupling said source to said heat exchanger means for transferring mix from said source to said heat exchanger means as said mix is dispensed from said heat exchanger,
    refrigeration means in operative relation with said heat exchanger means for cooling the mix in said heat exchanger means so as to congeal a portion of the mix and heating means in operative relation with said heat exchanger means for at least periodically heating the mix in said heat exchanger means in response to a buildup of the congealed mix in the heat exchanger which buildup would otherwise prevent flow of the fluid mix.

2. An apparatus as in claim 1 wherein said refrigeration means includes means for circulating a fluid about said mix and means for supplying a cooling fluid to said circulating means and wherein said heating means includes means for supplying a heating fluid to said circulating means.

3. An apparatus as in claim 2 further including means for sensing the temperature of said mix in said heat exchanger means and producing an electrical signal which varies as a function thereof and means connected to said sensing means for controlling supply of said heating and cooling fluids as a function of said signal.

4. An apparatus as in claim 3 wherein said heat exchanger means includes a hollow coil, a mix line disposed in said coil and said circulating means includes a circulating line disposed in said coil adjacent to said mix line.

5. An apparatus as in claim 4 wherein said refrigeration means includes a compressor, a condenser, means connecting said condenser and compressor to said circulating line and first valve means for cutting off flow of cooling fluid from said compressor and condenser through said circulating line and wherein said heating means include means connecting said condenser to said circulating line to deliver hot gasses to said circulating line and second valve means for cutting of flow of said hot gases from said compressor through said circulating line.

6. An apparatus as in claim 5 wherein said supply controlling means includes circuit means connected to said sensing means and to said first and second valve means for opening said first valve means to permit flow of cooling fluid whenever the sensed temperature is greater than a first predetermined value, opening said second valve means to permit flow of said hot gases whenever the sensed temperature is less than a second predetermined value.

7. An apparatus as in claim 6 wherein said temperature sensing means includes a first thermistor disposed adjacent to where said mix enters said mix line in said coil for sensing the mix temperature, and wherein said circuit means includes means for causing said compressor to operate when said first thermistor detects a temperature above said first predetermined value.

8. An apparatus as in claim 7 wherein said temperature sensing means further includes a second thermistor for producing a signal which varies as a function of temperature and disposed between where said mix enters said mix line and where said mix leaves said mix line for sensing the mix temperature and wherein said circuit means includes means responsive to the signals produced by said second thermistor for opening said second valve means only when said compressor is not operating.

9. An apparatus as in claim 8 wherein said circulating line includes an upper line and a lower line, wherein said second thermistor is disposed between where said upper line enters said coil and where said upper line leaves said coil and said temperature sensing means includes a third thermistor for producing a signal which varies as a function of temperature and disposed between where said lower line enters said coil and where said lower line leaves said coil, wherein said heating means includes means connecting said second valve means to said upper line and a third valve means for cutting off flow of said hot gases from said compressor through said circulating line and wherein said circuit means includes means connected to said third thermistor responsive to the signals produced by said third thermistor for opening said third valve means only when said compressor is not operating.

10. An apparatus as in claim 4 wherein said coil is stainless steel.

11. Apparatus cooling and dispensing a soft food mix comprising:
a heat exchanger for receiving the mix and passing the mix therethrough without mechanical agitation,
means for supplying the mix to the heat exchanger at a pressure above atmospheric,
cooling means for reducing the mix temperature to such a point as to congeal a portion of the mix,
means for alternately heating the mix and discontinuing the cooling of the mix in the heat exchanger in response to a buildup thereof so as to maintain the mix in the heat exchanger in a fluid state and at a proper consistency and
dispensing the mix from said heat exchanger.

12. A method of cooling and dispensing a soft food mix comprising the steps of,
supplying said mix to a heat exchanger at a pressure above atmospheric pressure,
cooling the mix as it moves therethrough without mechanical agitation to such a temperature such that at least a portion of the mix is congealed,
periodically heating the congealed mix in said heat exchanger in response to a buildup thereof so as to maintain the mix in said heat exchanger in a fluid state and at a proper consistency and
dispensing the mix from said heat exchanger.

13. A method as in claim 12 wherein said step of heating and cooling includes the step of sensing the temperature of said mix and shifting from heating to cooling and cooling to heating in accordance with the sensed temperature.

14. An apparatus as in claim 1 further including means for sensing the temperature of the mix in said heat exchanger means and for controlling said heating and refrigeration means as a function of said temperature so as to prevent formation of an ice plug in said heat exchanger means.

* * * * *